Dec. 11, 1934.  J. DOLZA  1,983,745
ROLLER TYPE TRANSMISSION CONTROL
Filed Feb. 10, 1933  5 Sheets-Sheet 1

Inventor
John Dolza
By Blackmore, Spencer & Flick
Attorneys

Dec. 11, 1934.    J. DOLZA    1,983,745
ROLLER TYPE TRANSMISSION CONTROL
Filed Feb. 10, 1933    5 Sheets-Sheet 2

Inventor
John Dolza
By Blackmore, Spence & Flint
Attorneys

Inventor
John Dolza
By Blackmore, Spencer & Flint
Attorneys

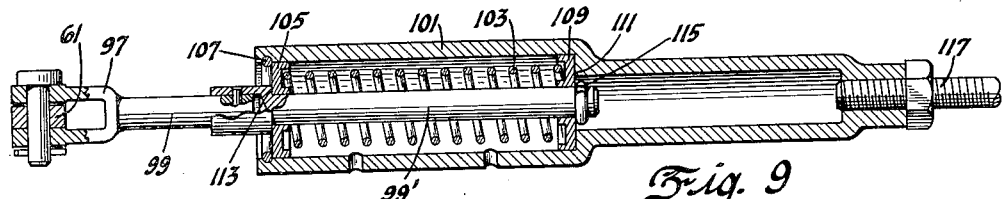
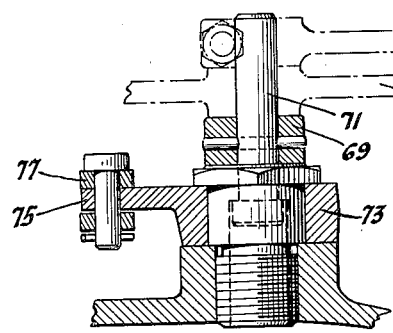
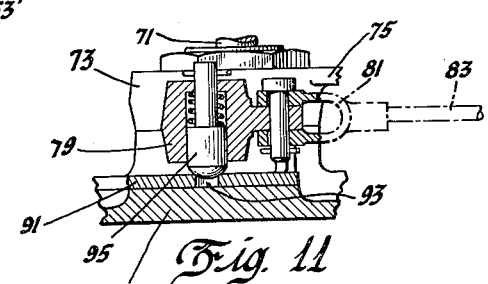
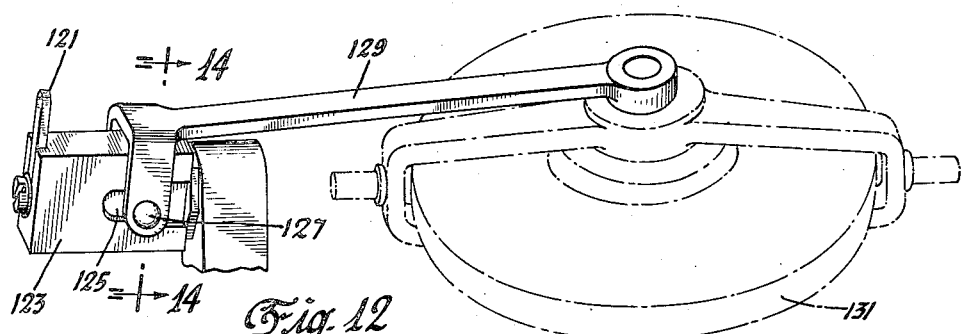
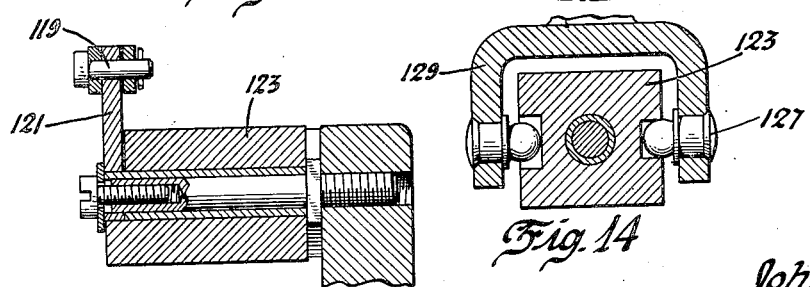

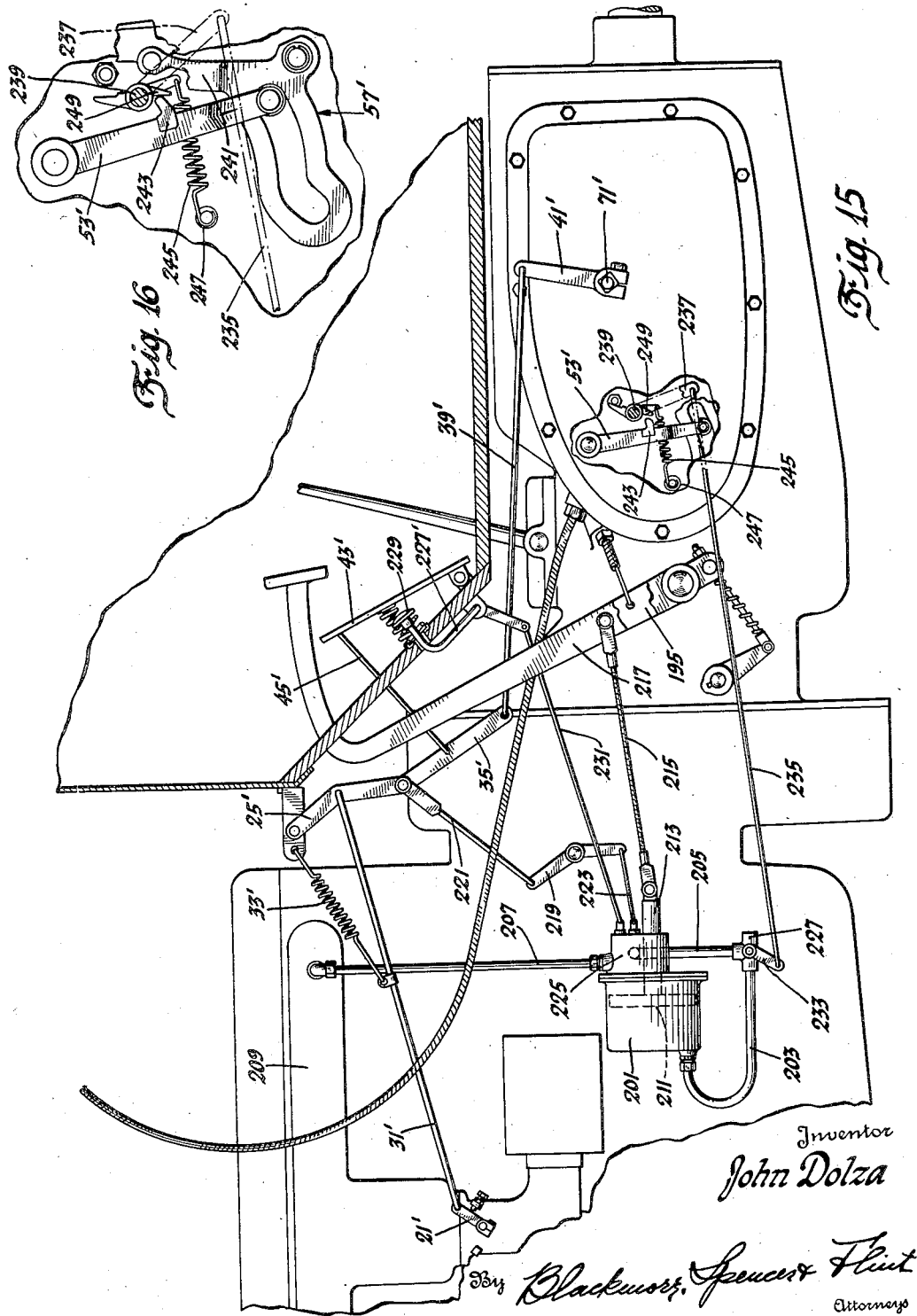

Patented Dec. 11, 1934

1,983,745

UNITED STATES PATENT OFFICE 1,983,745

ROLLER TYPE TRANSMISSION CONTROL

John Dolza, Flint, Mich., assignor to General Motors Corporation, Detroit, Mich., a corporation of Delaware Application February 10, 1933, Serial No. 656,145

11 Claims. (Cl. 74—336.5)

This invention relates to control mechanism for change speed power transmission, particularly for use on motor vehicles. More specifically it has been designed for use with a change speed transmission of the friction roller type.

In transmission mechanism of the kind referred to it has been proposed to provide a speed responsive governor to change the driving ratio through the instrumentality of a differential lever and also to provide connections from the accelerator pedal which shall operate subsequently to full throttle position of the accelerator pedal to operate through the differential lever upon the transmission mechanism tending to reduce the driving ratio and secure maximum acceleration.

It has also been proposed to provide, in such an organization, manually operable means to modify the action of the governor.

One object of my invention is to provide, in such a transmission control, mechanism associated with said differential lever and operated by said manually operated governor modifying means, mechanism to shift said transmission to a 1:1 ratio whereby the engine may be started by towing the vehicle.

Another object is the provision of means to automatically release the clutch at a predetermined low engine speed.

In transmissions of this kind it is known to provide springs through which the governor, and also the accelerator pedal after a movement to full throttle position, operate to shift driving ratios. As another and specific object of this invention I have designed a structure wherein a single spring performs the function of a plurality of springs as hereinbefore used.

As a still further object the invention includes an improved dashpot control of the ratio shifting mechanism and a connection between that control and the brake hook-up to cut out the action of the dashpot when the brake is being applied, thereby permitting a quick shift to low speed to ensure restoration of the ratio to low speed for the subsequent starting.

Other objects and advantages will be understood from the following description.

In the drawings—

Figure 5:
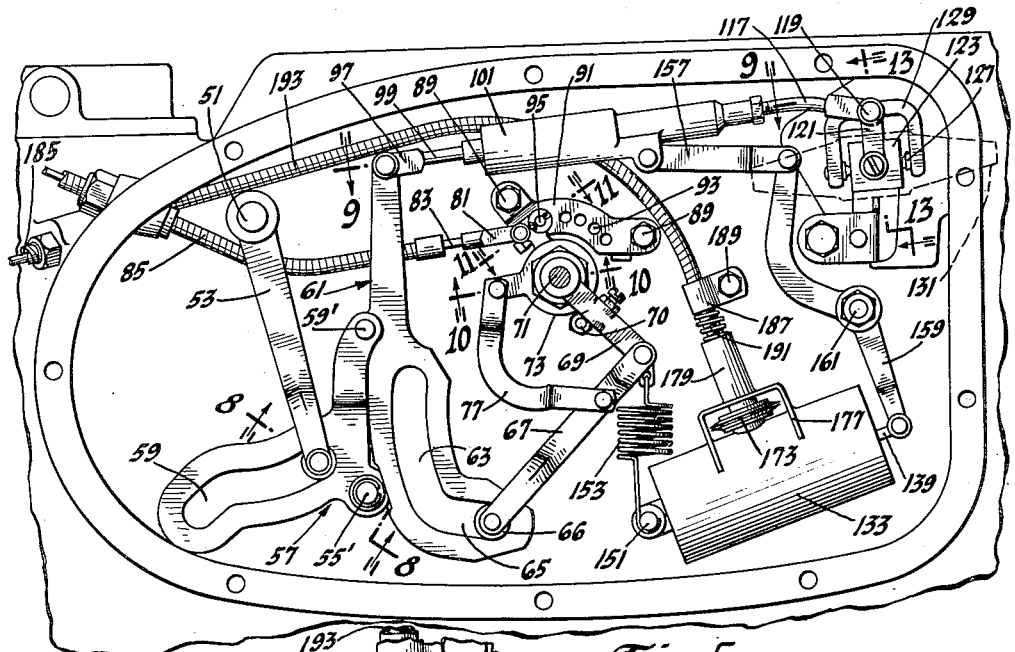
Fig. 5 is a similar view showing the parts in the position they assume when the engine is being started by towing the vehicle.
Figure 6:
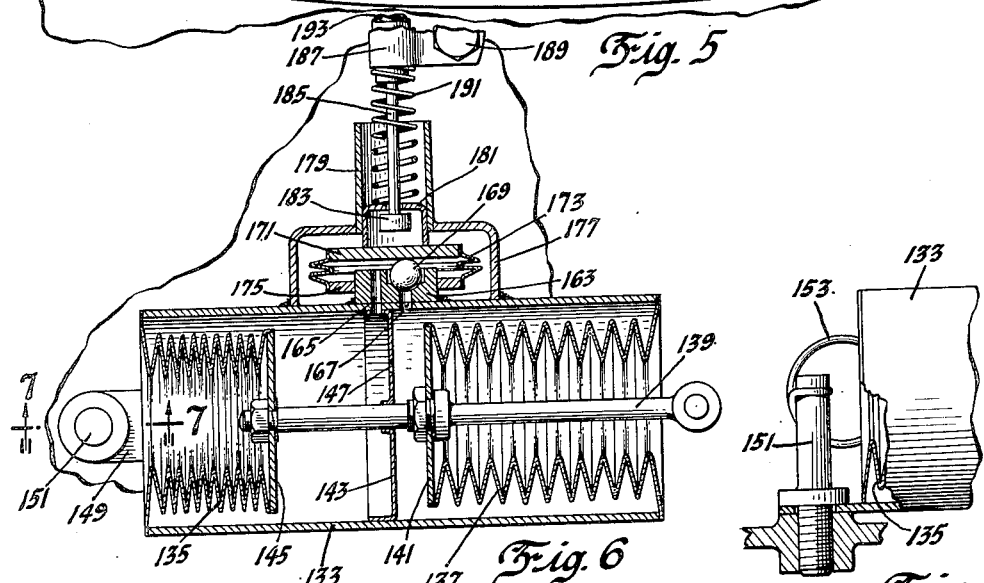
Fig. 6 is a longitudinal section through the dashpot which controls the rate of speed ratio changing.
Figure 7:
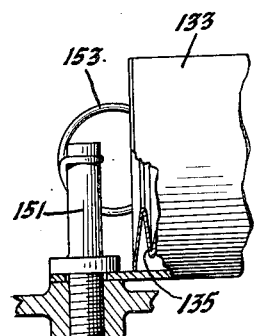
Figure 8:
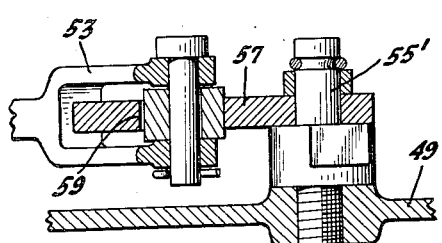

Fig. 7 in a section on line 7—7 of Fig. 6.
Fig. 8 is a section on line 8—8 of Fig. 5.
Fig. 9 is a section on line 9—9 of Fig. 5.
Fig. 10 is a section on line 10—10 of Fig. 5.
Fig. 11 is a section on line 11—11 of Fig. 5.
Fig. 12 is a perspective of the ratio changing mechanism.
Fig. 13 is a section on line 13—13 of Fig. 5.
Fig. 14 is a section on line 14—14 of Fig. 12.
Fig. 15 is a view in side elevation of a modified form.
Fig. 16 is an enlarged view in side elevation of certain parts shown in Fig. 15.

Referring by reference characters to the drawings, numeral 17 represents the engine of a motor vehicle, 19 being the carburetor and 21 the throttle operating lever shown in its idling position and engaging a stop 23. A lever 25 is pivoted at 27 in front of the dash 29. Between a mid point of the lever 25 and throttle lever 21 is a link 31. A spring 33 functions to hold the throttle in its closed position. A differential lever 35 and the lever 25 have their adjacent ends pivoted together at 37. A link 39 connects the end of differential lever 35 to a lever arm 41 associated with the transmission control and operating in a manner to be described below. The accelerator pedal 43 is connected by a link 45 to a mid point of lever 35. A spring 47 may be used to hold the accelerator pedal in released position. When the accelerator pedal is depressed the resistance to counterclockwise rotation of lever 41 is greater than to a clockwise rotation of lever 25. Lever 25 is therefore rotated when the pedal is first depressed without rotating lever 41. This rotation continues until the throttle lever reaches its full open stop 23'. While the throttle is being so rotated the differential is rocking about its lower end as a center. Thereafter further depression of the accelerator pedal rocks lever 35 about its upper end as a center, and lever 41 is rotated in a counterclockwise direction.

Figure 1:
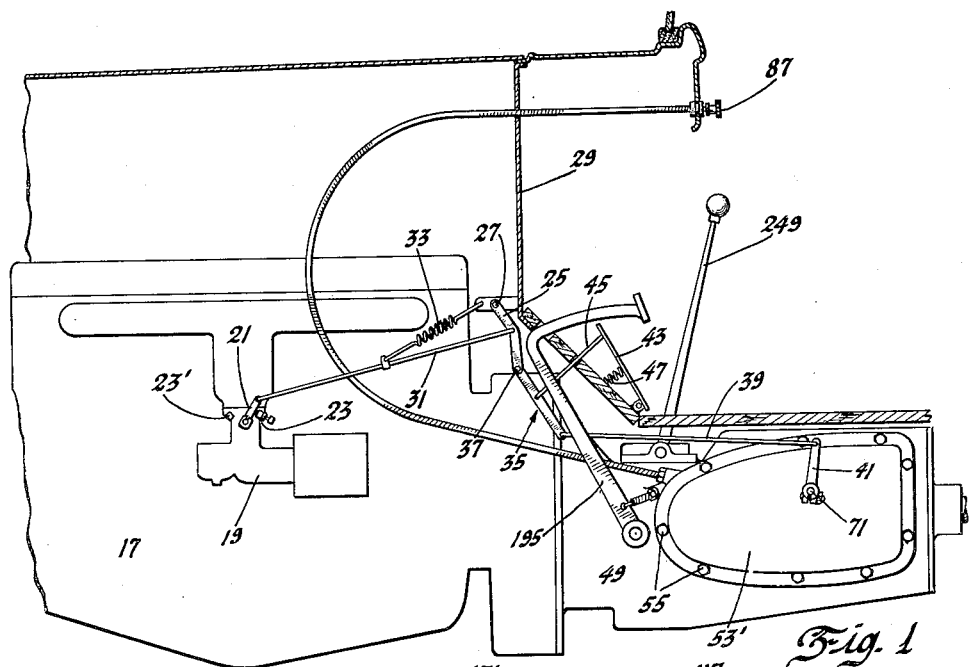
Fig. 1 is a view in side elevation of the engine and transmission of a motor vehicle with my novel control mechanism associated therewith.
Figure 2:
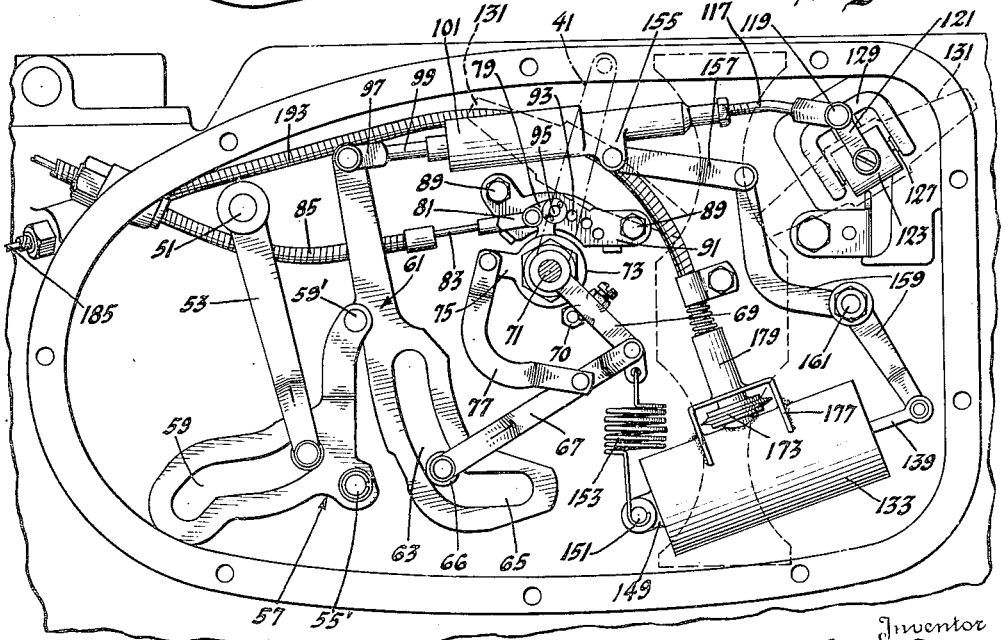
Fig. 2 is a view in side elevation of the control mechanism per se.

Within the transmission housing 49 is a governor (not shown) which is speed responsive preferably to the rotation of the input shaft to rotate a shaft 51 as shown in Fig. 2. This shaft does not appear in Fig. 1 inasmuch as it and the other parts of the control mechanism are beneath the cover 53' which is secured in position by fastening means 55. At 55' is a pivot for a swinging member 57 having a cam slot 59 in which moves a roller carried by the end of the lever arm 53. Swinging member 57 has a terminal pivot 59' for an intermediate pivot point of a differential lever 61. The lever 61 has a slot 63 as shown, terminating in a portion 65 at an angle to the main portion thereof. In the slots 63 and 65 is a roller 66 carried on the end of a link 67 which is pivoted to a lever arm 69 fixed to a shaft 71 to which shaft lever 41, referred to above, is also secured. Rotatable about the axis of shaft 71 is the hub of a lever 73 having an arm 75. A curved link 77 connects the lever arm 75 with the link 67. Lever 73 has another arm 79 to which is connected the forked end 81 of an operating link 83. This may be a flexible cable and may be housed in a flexible tube 85. The flexible cable 83 may terminate in a hand-operated button 87 in the instrument board as shown in Fig. 1. Secured to the transmission housing by fastening means 89 is a bracket 91 having apertures 93, which apertures are distributed in arcuate fashion as shown. A spring-pressed plunger 95 is carried in lever arm 79 and may be engaged in one or another of these apertures.

The upper end of lever 61 is pivotally connected at 97 to a rod 99. The rod is secured to a rod extension 99' entering the casing 101 in which is a spring 103 between the disc 105 which engages a retaining ring 107 at one end and a disc 109 engaging a shoulder 111 at the other end. The rod extension 99' has a shouldered part 113 to engage disc 105 and an abutment 115 to engage the disc 111. By this means reciprocation of rod 99 and 99' operates to compress the spring (from one end or the other) in both its movements of reciprocation. One end of rod 117 is threaded into the end of casing 101. The other end of rod 117 is fastened as at 119 to an arm 121 extending from a block 123 (see Fig. 12). Block 123 has slots 125 to receive trunnions 127 carried by the end of a roller shifter 129 designed to shift the angular position of a master roller 131 in its relation to the driving and driven discs, one of which appears in dotted lines in Fig. 2. No invention is herein claimed for the structure for changing the angular relation of the rollers and discs, and no further description is therefore necessary.

In devices of this kind it is known to make use of a dashpot to restrain a too free shifting movement. At 133 I have shown a dashpot cylinder to the opposite open ends of which are secured telescopic bellows 135 and 137 (see Fig. 6). These bellows are preferably of metal. A reciprocating rod 139 extends through bellows 137 and is secured to the closed head 141 thereof. The rod then extends through a partition 143 within the cylinder. This rod is terminally secured to the head 145 of the bellows 135. Partition 143 has one or more restricted openings 147 whereby the fluid may pass from one side to the other. The cylinder 133 has an apertured lug 149 pivoted to the housing by a pivot pin 151. Upon this pivot pin there also may be anchored spring 153 secured to the lever arm 69. This spring operates to hold lever 69 on an adjustable stop 70. It is the tension of this spring which offers the resistance to the initial rotation of lever 41 referred to above. Casing 101 has a lug 155 to which is pivoted a link 157. The link 157 is itself pivoted to one end of the lever 159, the latter fulcrumed at 161. The other end of this lever 159 is pivoted to the rod 139.

Referring again to Fig. 6, it will be seen that cylinder 133 has a boss 163 provided with passages 165 and 167, one of these passages being on one side of the partition and the other on the other side thereof. A spherical member 169 seats within and closes opening 167, being held normally in engagement with the opening by a disc 171, there being a bellows 173 between the disc 171 and a ring 175 welded to the boss. Surrounding the parts 163 and 175 is an inverted cup 177 also welded to the cylinder 133. Secured in an opening in the bottom of the cup is a tubular extension 179. The disc 171 has a shallow cup 181 secured thereto, which cup 181 is dimensioned to slide in the extension 179. Within the shallow cup 181 is the head 183 of a rod 185, the rod extending through the bottom of the cup 181 and also through the cylindrical extension 179. An abutment 187 is secured by fastening means 189. The abutment engages the end of spring 191, which spring also engages the bottom of cup 181. The rod 185 may be the end of a flexible cable housed within a flexible housing 193. The cable is for manual operation and may be attached to the brake lever 195.

Figs. 15 and 16 show the use of a vacuum releasable clutch mechanism in combination with a roller friction transmission control. When vacuum-operated clutch release is provided, it has been customary to provide means to vent the power cylinder upon the depression of the accelerator pedal and to automatically open the suction line and thereby release the clutch when the accelerator pedal pressure is released. This has much the effect of a free wheeling clutch. In the present invention it is desired to prevent the release of the main clutch and prevent free wheeling by the mere act of releasing the accelerator pedal except at low speed. By thus preventing the release of the clutch when the speed is high, any severe loads on the roller transmission are avoided. To obtain this result there is required a relationship between the transmission control mechanism and the vacuum clutch release mechanism. Such a relationship is shown in Figs. 15 and 16 and will now be described.

Numerals 21', 31', 33', 25', 35', 45', and 43' correspond with the similar parts of Fig. 1. At 201 is shown a power cylinder having a conduit line represented by numerals 203, 205, 207 with the engine manifold 209. Within the power cylinder is a piston 211 having a rod 213 connected by a flexible cable 215 to the clutch pedal 217. A two-arm lever 219 is connected by a link 221 to the junction of levers 25' and 35' and by a link 223 to a plunger in a valve chamber 225. Pivoted under the floor board is a lever 227' having an arm provided with a manually operable button 229. A link 231 connects the lever 227' with a second plunger in the valve chamber 225. These plungers, when pulled out and pushed in respectively, are operable to vent the power cylinder 201 and when reversely moved operate to open the suction line from the manifold to the power cylinder. The operation of this system of valves is well known, the button 229 serving as a master control and the accelerator pedal operable to permit the release of the clutch when vacuum is removed therefrom. An additional valve 227 joins conduits 203 and 205. It may be positioned to provide communication between the pipes 203 and 205 or it may close off pipe 205 and vent the power cylinder 201 through pipe line 203 and a suitable atmospheric opening. Valve 227 has an arm 233 connected by a link 235 to an arm 237 which turns on pivot 239 (see Fig. 16). Rigid with the arm 237 is an arm 249 adapted to be engaged by a lug 243 on arm 53' which corresponds with arm 53 in the form first described. The engagement referred to occurs when the latter swings to the position shown in Fig. 16, which is the position corresponding with the arm 53' when the engine is idling. In assuming this position the arm 237 pulls through link 235 and turns valve 227 to a position connecting conduits 203 and 205 whereby the suction may release the clutch. This operation can occur, however, only when the engine shaft is at a predetermined low speed since, at other times, the arm 53' is moved by the governor to carry the lug 243 away from arm 241 whereupon the spring 245, suitably anchored as at 247, pulls upon another arm 249 also rigid with arm 237 and rocks the valve to a position venting the power cylinder. Owing to the location of the valve 227 this action is positive and no manipulation of the rods 231 or 223 by the button 229 or the pedal 43' can interfere with its action in maintaining the cylinder 201 inoperative to release the clutch except at a predetermined low engine speed. Even under these circumstances the vacuum will not be available unless the accelerator pedal is released and unless the master control button is depressed. In the event that the master control button is not depressed, it will be obvious that the clutch must be manually released when the engine reaches idling speed to avoid stalling.

Figure 3:
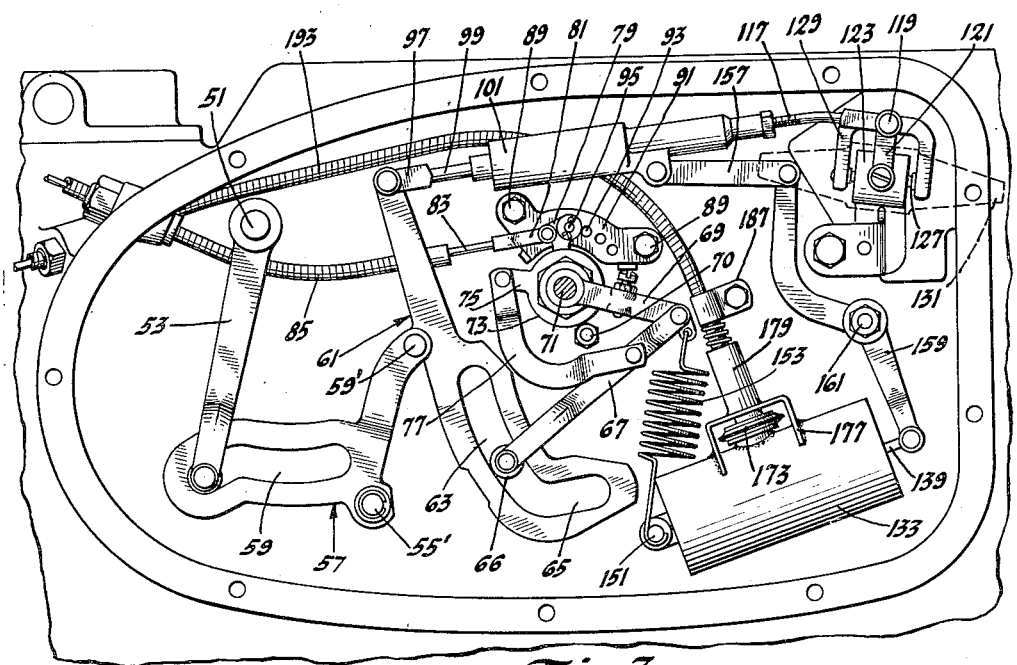
Fig. 3 is a similar view of the control mechanism with its parts in changed position.
Figure 4:
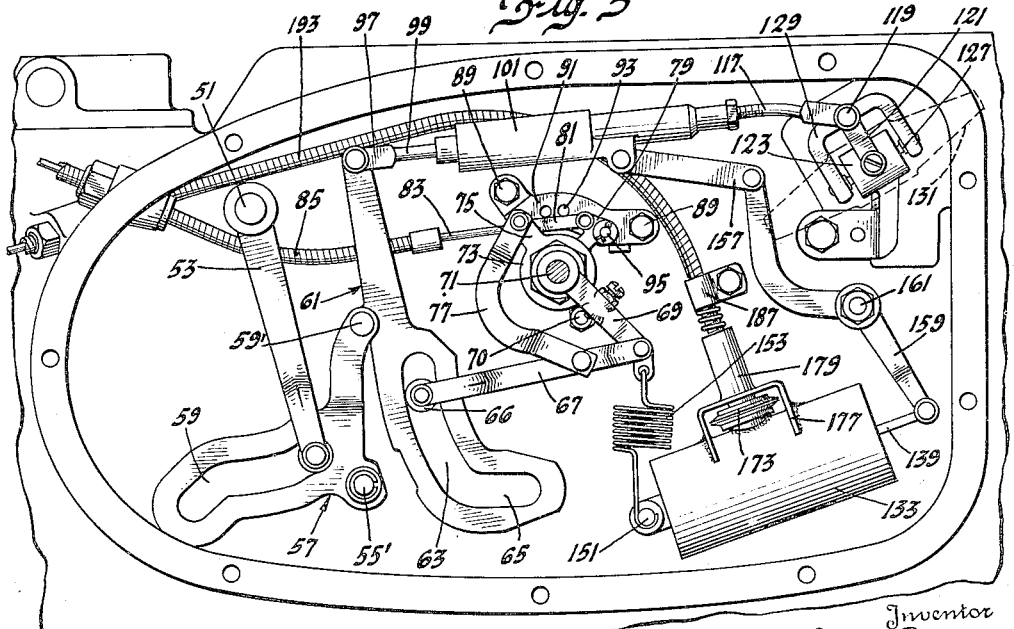
Fig. 4 is another similar view with its parts in still another position.

The operation of the mechanism will now be briefly described. In the form shown by Figs. 1-14 when the vehicle is at rest, and when the engine is idle the parts are substantially as shown in Fig. 2. The governor actuated arm 53 has its lower end at the right end of slot 59 and the roller 66 is in what may be called the maximum power setting to facilitate starting the car from a position of rest. The rollers 131 are in their low ratio position. Lever 249 may be used to place in neutral any suitable forward and reverse gearing, not shown, between the main clutch and the roller transmission. The engine may then be started, the clutch released, and the lever 249 shifted to provide forward driving. As the engine is now operating the clutch will be held released by the suction of the manifold in the event that the construction shown by Fig. 15 is employed provided the button 229 is depressed. As the accelerator is depressed the clutch is engaged; the engine speed increases and the governor arm 53 is rocked from the position shown in Fig. 2 toward the position shown by Fig. 3. In so moving, owing to the shape of the cam slot 59, the pivot 59' of the lever 57 moves about the point 55' as a center and the differential lever 61 is thereby rocked about pivot 66. Through the instrumentality of rods 99 and 117 and the spring 103, the rollers are shifted from their low ratio toward their high ratio position. With the position of the arm 67 and the roller 66 shown by Fig. 2, the engine operates with the maximum efficiency in starting the car. Should a greater economy of fuel due to a more rapid shift to higher ratios be desired at the expense of engine performance, the button 87 may be manipulated to swing lever 73 and thereby change the position of roller 66 from that shown in Fig. 2 toward that shown in Fig. 4, thus changing the leverage of the swinging member 57 in rocking the differential lever 61 in such a way that a faster shift to high ratio is effected as will be obvious. Adjustment of the dash control to change the position of roller 66 from that shown in Fig. 2 to that of Fig. 4 does not, per se, affect the driving ratio if the governor is at idling speed.

To start the car by towing, the button 87 is manipulated to rotate lever 73 and with it parts 77 and 67, the latter turning about the end of arm 69 in a direction such that the roller 66 moves in the slot 65, thereby rotating the differential lever 61 about the pivot 59' and shifting the rollers to a relatively high ratio—preferably 1:1— position.

The shifting of the driving ratio is accompanied by a rocking of lever 159 and a reciprocation of rod 139 in the dashpot 133. This movement requires a transfer of fluid from one side to the other of the partition 143. The opening 147 in the partition permits a slow transfer of fluid and thereby prevents a too rapid change in the driving ratio since the force on rod 139 is limited to spring 153.

Such a gradual retardation is desirable. If, for example, the accelerator pedal has been depressed below its full throttle position to secure maximum acceleration by the rotation of parts 41, 71, 69, and 61 and is suddenly released, the dashpot action ensures the closing of the throttle prior to the ratio changing. In the absence of such dashpot resistance the release of the accelerator pedal from a position where it is exerting a force tending to effect a low ratio would make possible a sudden shift toward a higher ratio and, due to the inertia of the engine, this might cause car acceleration at the very time when deceleration is desired. After the throttle is closed to idling, the dashpot begins to permit the ratio to shift to low. The dashpot is used to control rate of shift of transmission. Without it the driver could shift transmission very fast and the car operation would be jerky.

When decelerating, as at a traffic intersection, it may be desirable to shift down quickly without the delayed action of the dashpot to ensure the transmission ratio being returned to low. The actuation of the brake pedal lifts the disc 171 and the ball 169 rises to permit free flow of fluid from one side of the partition to the other, whereby the dashpot becomes practically ineffective.

I claim:

1. In transmission mechanism for vehicles, ratio changing means, a speed responsive member, a manually operable member, a differential lever, connections whereby the speed responsive member and the manually operable member may move said ratio changing means through the instrumentality of said lever, adjustable means to change the leverage of said members upon said lever, said adjustable means constituted by the provision of a slot in said lever and a fulcrum movable in said slot, said lever also having a slot in the form of an extension of said first slot into which said fulcrum member may be moved to thereby make possible the rotation of the differential lever to shift the ratio changing to effect relatively high driving ratio.

2. In transmission mechanism for motor vehicles including a race and movable rollers, manual means and speed responsive means jointly and individually operable to control the position of said rollers, and other manual means to shift said rollers to a relatively high ratio position to facilitate starting the motor by towing the vehicle.

3. In transmission mechanism for motor vehicles including toric races and rollers, means to shift said rollers to effect an infinite number of driving ratios, manual means and speed responsive means operable jointly and individually on said means and second manual means operable upon said shifting means, independently of said manual means and speed responsive means, to shift said rollers to a high ratio position to facilitate starting the motor by towing the vehicle.

4. In transmission mechanism for vehicles, means normally operating automatically to shift said mechanism to provide changed driving ratios, and manually operated means to shift said mechanism to a relatively high ratio to facilitate starting by towing, said first-named means including a shifting member, a governor-operated arm, a swinging member movably associated with said arm, a differential lever pivoted to said swinging member and a connection between said differential lever and said shifting member, said manually operated means including connections with the differential lever whereby said differential lever is rotated about its connection with the swinging member.

5. In transmission mechanism, a shifting member movable to change the driving ratio, speed responsive means including a movable arm, operating connections between said arm and said shifting member including a swinging member and a differential lever pivoted thereto, manually operated means to change the fulcrum of the differential lever to vary the rate of ratio change as influenced by the speed responsive means, and also to rotate the differential lever about its pivotal connection with the swinging member to shift the mechanism to a relatively high ratio to facilitate starting by towing.

6. In a vehicle, a fluid pressure clutch-releasing device, an infinitely variable speed transmission, a member movable to positions corresponding to varying driving ratios, means to normally render said clutch releasing device inoperative, and means operable by said movable member only as it approaches a predetermined low speed ratio position to overcome said first mentioned means and to thereby permit clutch release by fluid pressure.

7. In a vehicle, a fluid pressure clutch releasing device, a variable speed transmission, a governor-controlled member to change the speed ratios of said transmission, means normally operable to render said clutch-releasing device inoperable, and means operable by the governor controlled means as it approaches low speed ratio position to overcome said first-mentioned means to permit fluid pressure clutch release.

8. In combination with a friction roller transmission, a member movable to shift the rollers and change the driving ratio of the transmission, a dashpot device to control the rate of shifting, said dashpot device having a movable part, connecting means between said movable part and said movable member, said dashpot comprising a casing, a rod reciprocated therein, an intermediate partition in said casing plates carried by said rod on opposite sides of said partition, means connected to said plates and to the casing ends to seal the space within the casing, said partition being provided with a restricted opening.

9. The invention defined by claim 8, said connecting means being a collapsible bellows.

10. The invention defined by claim 8 together with parts constituting a chamber adjacent said casing with passages communicating with said chamber and with opposite sides of said partition, a closure for one of said passages, yielding means to hold said closure in operative position, and means to overcome said yielding means and permit substantially unrestricted flow of fluid from one side of the partition to the other through said chamber.

11. The invention defined by claim 8 together with parts constituting a chamber adjacent said casing with passages communicating with said chamber and with opposite sides of said partition, a closure for one of said passages, yielding means to hold said closure in operative position, and means to overcome said yielding means and permit the flow of fluid from one side of the partition to the other through said chamber together with brake-operating means, the said means operable to overcome the yielding means being connected to the said brake-operating means.

JOHN DOLZA.